United States Patent [19]

Brown et al.

[11] 4,061,956

[45] Dec. 6, 1977

[54] ELECTRONIC DC BATTERY CHARGER

[75] Inventors: Lowell K. Brown, Midvale; William Albert Newman; William A. Boyd, both of Salt Lake City, all of Utah

[73] Assignee: Utah Research and Development Company, Salt Lake City, Utah

[21] Appl. No.: 716,524

[22] Filed: Aug. 23, 1976

Related U.S. Application Data

[63] Continuation-in-part of Ser. No. 629,285, Nov. 6, 1975, Pat. No. 4,016,473.

[51] Int. Cl.² .............................................. H02J 7/04
[52] U.S. Cl. ...................................... 320/22; 320/21; 320/23; 320/39
[58] Field of Search ...................... 320/22, 23, 24, 35, 320/36, 39, 21, 43

[56] References Cited

U.S. PATENT DOCUMENTS

| | | | |
|---|---|---|---|
| 3,614,583 | 10/1971 | Burkett et al. | 320/22 X |
| 3,659,181 | 4/1972 | Bembenek | 320/22 |
| 3,917,990 | 11/1975 | Sherman, Jr. | 320/22 X |

Primary Examiner—Robert J. Hickey
Attorney, Agent, or Firm—Trask & Britt

[57] ABSTRACT

A battery charger receives direct current power from an external source through a power connector. Switch means receives the power from the power connector and supplies it to a boost circuit which is removably and conductively connected to a battery. A control circuit is connected to receive a battery voltage signal from the battery and a battery temperature signal from a temperature sensor positioned to detect battery temperature. The control circuit determines the state of charge of the battery from the voltage and temperature signals. The control circuit supplies (1) switching signals to the switch means to cause the switch to be conductive, and (2) boosting signals to the boost circuit to cause the boost circuit to charge the battery in accordance with a preselected charging program related to the state of charge of the battery. A safety circuit may also be adapted to sense unsafe battery and battery charger parameters and cause the control circuit to generate a switching signal to cause the switch means to be nonconductive upon the occurrence thereof. The battery charger is particularly adaptable for use with vehicles.

31 Claims, 5 Drawing Figures

ELECTRONIC DC BATTERY CHARGER

RELATED APPLICATION

This application is a continuation-in-part of U.S. patent application Ser. No. 629,285 filed Nov. 6, 1975, which is commonly assigned and is now U.S. Pat. No. 4,016,473.

BACKGROUND OF THE INVENTION

1. Field

This invention relates to battery chargers. More particularly, this invention provides for an electronic battery charger which receives direct current power as an input and generates a preselected charging program related to the state of charge of the battery and which is particularly suitable for use with vehicles.

2. State of the Art

In many applications batteries are used as a temporary or emergency source of power. For example, in certain kinds of vehicles (e.g., aircraft), batteries act as a source of power for starting engines and as an emergency source of power in the event the generator typically associated with the engines of the vehicle fails. For such applications, it is important to return the battery to and maintain it in a fully charged condition after use. However, it is well known that charging a battery to and maintaining it in a fully charged condition is a multifaceted problem involving many factors. For example, battery type, battery age and useful life, available charging power, physical environment, and battery capacity are just some of the factors to be considered in selecting not only the battery to be used but also the battery charger and charging program to optionally charge and recharge the battery.

In some applications, it is essential that the battery be rapidly, safely and fully charged from whatever level of discharge of the battery, including deep discharge. Further, it may also be important that charging be done automatically and reliably. This is particularly important for vehicles in which the battery is required to reliably deliver starting power and/or act as a reliable source of emergency power because of the nature of the vehicle's environment or use. Such vehicles include aircraft, military tanks, power boats, surface effect water craft, certain recreational (e.g., off-the road) vehicles and the like. In other applications, the type of battery used suggests that the battery be properly and efficiently charged to prolong battery life and to improve battery effectiveness and performance. For example, heavy equipment (i.e., bulldozers, graders, etc.) vehicles and other diesel engine equipment may use expensive high capacity batteries which should be optimally charged to prolong their life and effectiveness.

Although various and sundry battery chargers and charging programs are known, a reliable, safe and automatic battery charger for optimally charging and recharging batteries, and especially high capacity batteries, is not available.

SUMMARY OF THE INVENTION

A battery charger is comprised of a power connector, switch means, a boost circuit and a control circuit. The charger receives direct current power from an external source through the power connector. The switch means receives the power from the connector and supplies it to the boost circuit. A battery voltage signal and battery temperature signal are supplied to the control circuit by the battery and by temperature sensing means respectively, to determine the state of charge of the battery. The control circuit sends a switching signal to the switch means to cause the switch to become conductive; and it sends a boosting signal to the boost circuit to charge the battery in accordance with a preselected charging program related to the state of charge of the battery. The battery charger also may have a safety circuit to detect unsafe conditions and stop the battery charging upon detection thereof.

In one embodiment, the control circuit is comprised of a voltage control circuit, a boost control circuit, a topping control circuit and a switch control circuit. The voltage control receives the battery temperature and voltage signals and supplies the boost control, topping control and switch control with a temperature adjusted battery state of charge signal which causes the boost control, topping control and switch control to charge the battery in accordance with a preselected charging program. The charging program may be comprised of a plurality of modes, including a first mode in which the battery is trickle charged, a second mode in which the battery receives short high current charge, a third mode in which the battery receives its main charge preferably in the form of repetitive pulses of current, and a fourth mode in which the battery receives a topping charge preferably in the form of pulses of current. In a highly preferred embodiment, the control circuit may also apply a fifth mode in which the battery receives intermittent periods of pulse charging to maintain the battery fully charged.

In another embodiment the safety circuit may include means to detect the temperature of the charger interconnected with the control circuit to cause the charger to stop charging upon detection of a preselected unsafe charger temperature. The safety circuit may also include means to detect a preselected unsafe battery temperature, a shorted battery temperature detector and a shorted battery cell, each of which cause the charger to stop charging upon detection of their preselected unsafe conditions or parameters. The safety circuit may also include means to detect preselected unsafe input power voltage conditions which causes the charger to stop charging upon detection thereof. The safety circuit may also include means to indicate the existance of a faulty condition to an external indicator.

In yet another embodiment, the control circuit may include a relay control circuit to control relays external to said charger to interface the charger with the electrical system of its platform.

BRIEF DESCRIPTION OF THE DRAWINGS

In the drawings which illustrate the best mode presently contemplated for carrying out the invention.

DESCRIPTION OF THE ILLUSTRATED EMBODIMENT

Figure 1:
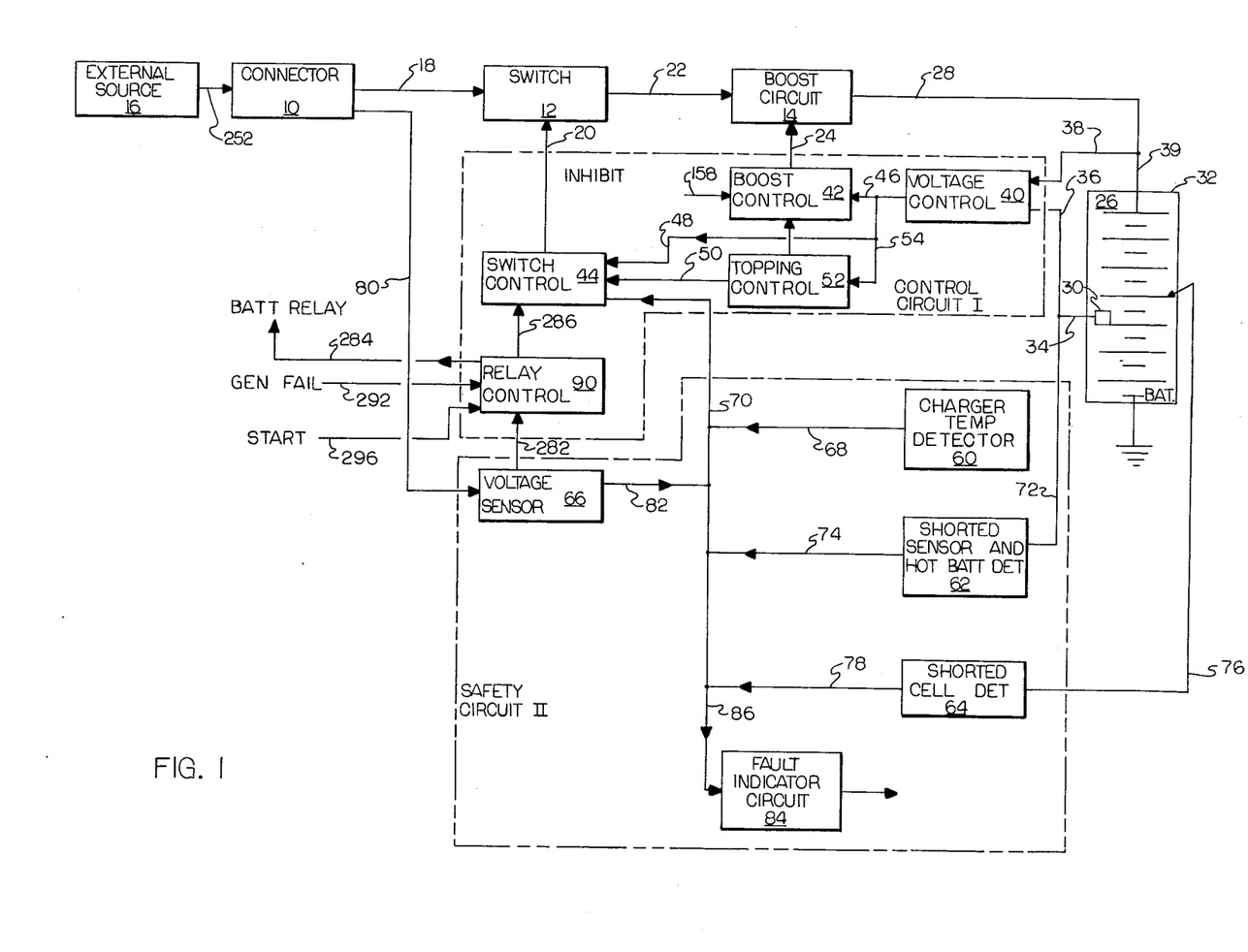
FIG. 1 is a simplified block diagram of a battery charger of the invention.

The simplified block diagram of FIG. 1 depicts a battery charger of the instant invention. The charger includes a power connector 10, switch means 12, a boost circuit 14 and Control Circuit I. The power connector 10 is conductively connectable to an external source of direct current (d.c.) power 16 to receive power (e.g., 25-28.5 volts d.c.) therefrom. The power connector 10 may be any connector device selected as convenient to the user which is capable of transmitting the current and the voltages associated with the battery and the charger of the particular application. It is preferably a male-female pin and socket connector.

The switch means 12 is conductively connected to the power connector 10 by conductor 18 to receive power therefrom. The switch 12 is also conductively connected to the Control Circuit I by conductor 20 to receive switching signals which cause the switch 12 to change between conductive, modified non-conductive, and non-conductive states as more fully discussed hereinafter.

The boost circuit 14 is conductively connected to the switch means 12 by conductor 22 to receive electrical power therefrom. The boost circuit 14 is conductively connected to the Control Circuit I by conductor 24 to receive boosting signals. The boost circuit 14 processes the input power received from the switch means 12 into charging current signals and supplies them to a battery under charge 26 via conductor 28. The charging current signals vary in magnitude and form in accordance with a preselected charging program as more fully discussed herein.

A temperature sensing device 30 is positioned with respect to the battery 26 to sense the temperature of the battery 26. Although the sensor 30 may be positioned external to the battery casing 32, it is preferably positioned within to improve the accuracy and time response of the sensor 30. The temperature sensor 30 may be any conventional temperature sensing device capable of generating an electrical signal reflective of the temperature being sensed. Preferably the temperature sensor 30 is an electrical resistor whose resistance varies linearly with temperature.

The Control Circuit I is conductively connected by conductors 34 and 36 to the temperature sensor 30 to receive a temperature reflective signal therefrom. The Control Circuit I is also conductively connected by conductor 38 to the output 39 of the battery 26 to receive a battery voltage signal therefrom. The Control Circuit I determines the temperature adjusted state of charge of the battery 26 from the battery voltage signal and temperature reflective signal. That is, it is well known to those skilled in the art that the state of charge of a battery is directly proportional to the battery's output voltage and the temperature of the battery. The Control Circuit I supplies the switching signals and boosting signals to automatically cause to charging current signals to be applied to the battery and vary in magnitude and form in accordance with a preselected charging program related to the state of charge of the battery 26.

As illustrated in FIG. 1, the Control Circuit I is comprised of several circuits including a voltage control circuit 40, a boost control circuit 42 and a switch control circuit 44. The voltage control circuit 40 receives the voltage and temperature signals from conductors 38 and 36 respectively, and supplies an output signal which reflects the temperature adjusted state of charge of the battery 26 to the boost control 42 and switch control 44 via conductors 46 and 48. The switch control 44 sends switching signals to the switch means 12 to cause the switch means 12 to be conductive when the voltage control output reflects a state of charge for which battery charging is desired in accordance with the preselected charging program. The boost control 42 generates boosting signals and supplies them to the boost circuit 14 to cause the boost circuit 14 to supply charging current signals to the battery 26 which vary in magnitude and form in accordance with the preselected charging program.

The Control Circuit I may also include a topping control circuit 52 conductively connected by conductor 54 to receive the output of the voltage control circuit 40. The topping control 52 is also conductively connected to the switch control 44 by conductor 50. The topping control 52 causes the switch control 44 to send a switching signal to the switch means 12 to in turn cause the switch means 12 to be conductive when the battery is nearly fully charged as indicated by the output of the voltage control 40. At the same time, the topping control 52 causes the boost control 42 to generate boosting signals which in turn cause the boost circuit 14 to supply charging current signals to the battery 26 in accordance with the preselected charging program.

A charging program may be regarded as a method of imparting electrical energy to an electrical storage battery in which the current and/or voltage of a charging signal are varied over time to place the battery in a state of fully charged. Various charging programs are known including (1) constant current, (2) constant voltage, (3) pulse current, (4) trickle current, and (5) hybrids or combinations thereof. Selection of a particular program is predicated not only on the type of battery (e.g., lead-zinc acid, nickel-cadmium akaline) to be charged, but also on other factors including the battery environment and use, and the capabilities of the battery charger.

In many applications, especially applications involving batteries of the size or type used on vehicles (e.g., aircraft, trucks, power boats, military tanks, etc.), it is desirable that the battery be retained as fully charged as possible and also returned to that state after full or partial discharge as expeditiously as possible without endangering the battery or platform. That is, rapid recharging or excessive overcharging of the battery can be hazardous. For example, such charging can result in the evolution of substantial amounts of explosive gas (e.g., hydrogen). Further, rapid recharging or excessive overchanging can overheat the battery to the point at which it will thermally runaway and explode. Also, improper and rapid recharging or excessive overcharging can have other deleterious results including excessive water consumption and plate deterioration which in turn can adversely affect battery capacity and battery useful life.

In addition to reflecting the above delimitations, a charging program of necessity must particularly recognize and be responsive to the practical characteristics of the battery to be charged. That is, the different sizes and kinds of batteries each have different voltage, current and capacity characteristics in addition to different low voltage or cell-reversal and fully charged characteristics. Further, the degree of discharge or the amount of charge to be imparted is another critical factor to be considered in determining which charging program is preferred.

The selection of a charging program is further constrained by the type or kind of battery charger available or known. A particular hybrid charging program may be the most preferred; but nonetheless it may be practically unavailable because a battery charger capable of imparting the program is not available. That is, known automatic battery chargers are typically constructed to provide a simplified charging program. Such programs may be a severe or substantial compromise and/or may be hazardous to the battery and vehicle platform because they can cause hazardous conditions through, for example, overcharging. The battery charger of the instant invention, however, allows one to preselect a charging program which is particularly responsive to the characteristics of the battery under charge and automatically responsive to its state of discharge while simultaneously providing for the safety or protection of the battery and its platform. At the same time, the charger of the instant invention allows for rapid recharging to a state of fully charged while improving the useful life of the battery.

For example, for 24 volt nickle cadmium batteries typically found aboard aircraft, it is highly desirable to avoid excessive gas generation because of the confined space and electrical/mechanical spark environment; and it is highly desirable to avoid thermal runaway because of the severe danger it imposes to an airplane and its ability to remain airborne. At the same time, it is particularly desirable to maintain the battery in a fully charged state and/or return it thereto, not only, for example, to start the engine, but also to provide emergency power in the event of an electrical generator failure while airborne. Further, the cost of such batteries suggests the desirability of extending the useful life thereof.

To charge such a battery, the charging program of the charger of the instant invention is a hybrid comprised of several modes each related to the state of charge of the battery or the amount of charge to be imparted to the battery. Accordingly, the charging current to be applied at any level of discharge may be selected to optimally return the battery to a state of fully charged.

The first mode of the program is applied or is in operation when the voltage control circuit 40 output reflects a battery state of charge of effective total discharge. That is, the battery is effectively dead and may have even experienced some cell reversal. For the 24 volt nickle cadmium aircraft battery under discussion, the average cell voltage would be less than 0.95 volts d.c. as indicated by a battery terminal voltage of about 18 volts d.c. for a 19 cell battery.

In the first mode, the switch control 44 sends a switching signal to the switch means 12 to attain a modified non-conductive state. That is, the switch means 12 is allowed to pass only a small amount of power to develop a small trickle charge current in accordance with the following relationship:

$$I_{TC} = (V_{in} - V_{batt}/R_{TC}) \qquad (1)$$

wherein:

$I_{TC}$ is the trickle charge current;

$V_{in}$ is the voltage of the input power from external source 16;

$V_{batt}$ is the voltage of the battery at the battery output 39; and $R_{TC}$ is a resistance value selected to limit the trickle charge current in accordance with the characteristics of the battery.

For the 19 cell volt battery under discussion, the $R_{TC}$ is preferably selected to be about 35 ohms. Accordingly, the trickle charge current ($I_{TC}$) rapidly charges the battery 26 and causes the battery voltage to increase and in turn cause $I_{TC}$ to decrease to a small value from about 0.2 to about 0.4 amperes in accordance with the relationship (1) above as the voltage of the battery ($V_{batt}$) reaches about 18 volts d.c. The boost circuit 14 passes the trickle charge current without modification in accordance with a boosting signal sent by the boost control 42 in response to the output of the voltage control 40. When the output of the voltage control circuit 40 indicates a battery voltage of about 18 volts d.c., the switch control 44 sends a switching signal to the switch means 12 to cause the switch means to become conductive and begin the second mode of charging.

The second mode charges the battery when the battery is substantially discharged. That is, the battery has not experienced cell reversal, but has nonetheless been deeply discharged so that very little useful capacity remains.

In the second mode, the input power from the external source 16 is connected directly to the battery 26 through the boost circuit 14 to rapidly charge the battery 26. The boost control 42 sends a boosting signal to cause the boost circuit 14 to pass the current without modification. The charging current at the beginning of mode two when the battery voltage has just reached the voltage obtained in trickle charging is quite high and may possibly approach a value of 5C amperes where C is the numerical value of ampere-hour capacity of the battery under charge. However, the charging current decreases rapidly as battery voltage rises. For the 19 cell 24 volt battery under discussion, the initial charging current in mode two may approach 50 amperes when the battery voltage has just reached about 18 volts at the end of mode one operations. When the battery voltage has risen to within about one (1) volt of the input power voltage in mode two, the output of the voltage control 40 causes the charger to shift to the third mode of charging.

The third mode of charging is desired when the battery has attained a state of charge anywhere from a low state to a nearly fully charged state. In the third mode, the switch contol 44 continues to send a switching signal to cause the switch means 12 to remain conductive. The boost control 42, however, sends a boosting signal to cause the boost circuit 14 to process the power it receives from the switch means 12 and supply a charging signal to the battery 26 which consists of repetitive pulses of current having a peak value of about 3C and an average value of about 1C. Mode three may be regarded as the main charging mode for charging the battery 26 when the battery state of charge is between about 20 percent and about 95 percent of the battery's nominal fully charged capacity. For the 19 cell nickle cadmium battery under discussion, the current pulses will have a peak value of about sixty (60) amperes and an average value of about twenty (20) amperes. When the output of the voltage control 40 indicates a battery voltage reflecting attainment of about 95% of fully charged (about 29.4 volts d.c. for the aircraft battery under discussion), the charger shifts to the fourth mode of charging.

In the fourth mode, the battery is nearly fully charged. The switch means 12 remains conductive; and the boost control 42 receives a topping signal from the topping control 42 to generate a boosting signal to cause the boost circuit to supply a constant charging current of about one-third of the battery's ampere hour capacity (1/3C) for a period of time which is preset to be about one-half the time the charger operated in mode three. In this way a topping charge (i.e., finishing rate charge) is applied to provide an approximately 15 percent overcharge at a low enough rate to prevent excessive gassing. For the 19 cell nickel cadmium battery the charging current is about six amperes.

Mode five, which may be regarded as a maintenance charging mode, commences at the completion of mode four. The switch control 44 generates a switching signal to cause the switch means to be non-conductive at the completion of mode four. As known to those skilled in the art, the battery voltage will thereupon fall exponentially toward an average battery voltage related to average cell voltage. When the output of the voltage control 40 reflects that the battery voltage has fallen a predetermined amount (e.g., 2.5 volts d.c.), the switch control 44 causes the switch means 12 to become conductive and the boost control 42 causes the boost circuit to commence operation just as in mode three. Of course, mode three operation will be very short because not much energy will be required to raise battery voltage to the point where the charger shifts to mode four. The duration of mode four will also be abbreviated (still one-half the time the charger operated in mode three). The charger will continue to cycle in mode five until a discharge causes the charger to apply a mode other than mode three through five.

Figure 2:
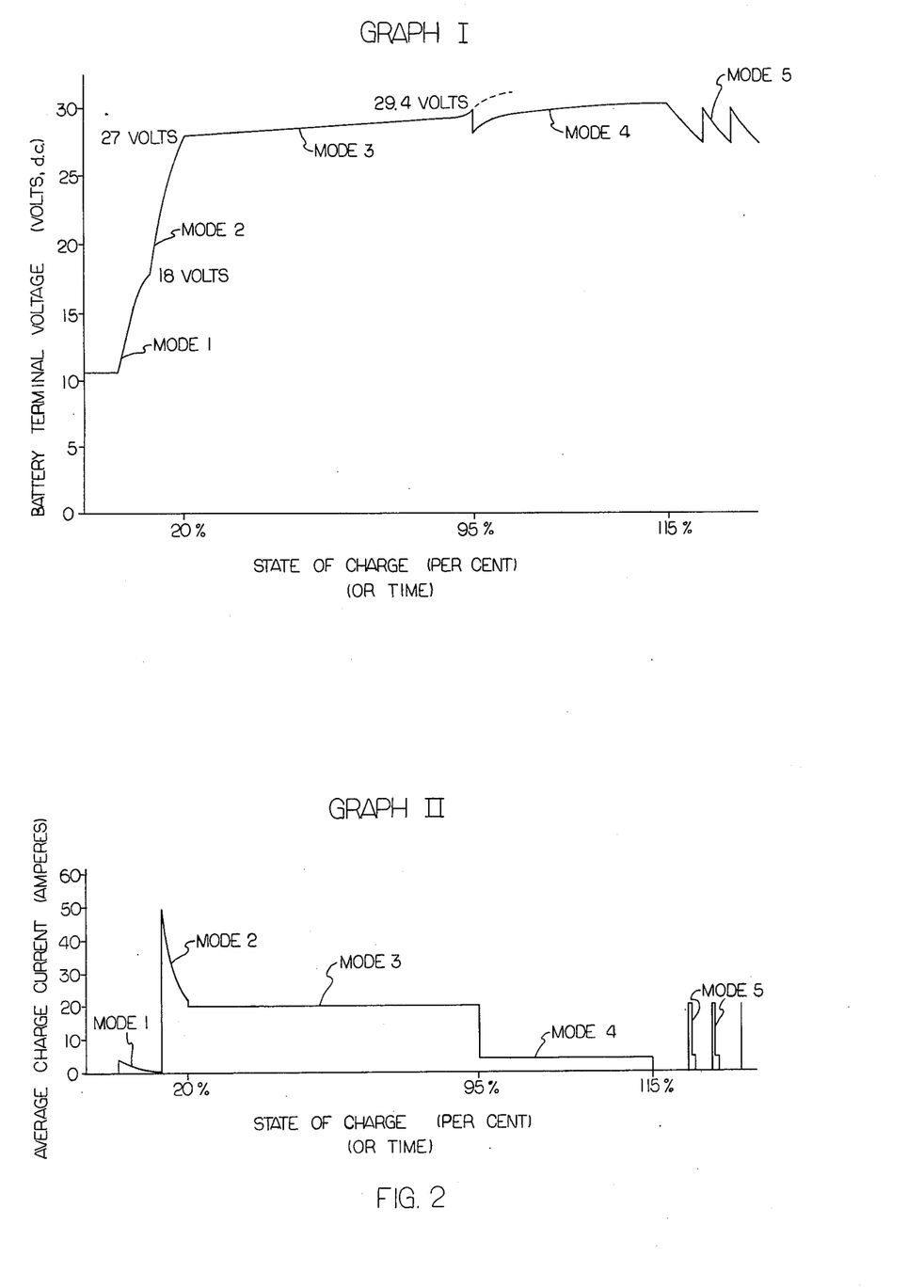
FIG. 2 is a graphical illustration of charging current and battery voltage for various charging modes of a battery charger and the type illustrated in FIGS. 3 and 4 charging a 19 cell nickle cadmium battery.
Figure 3:
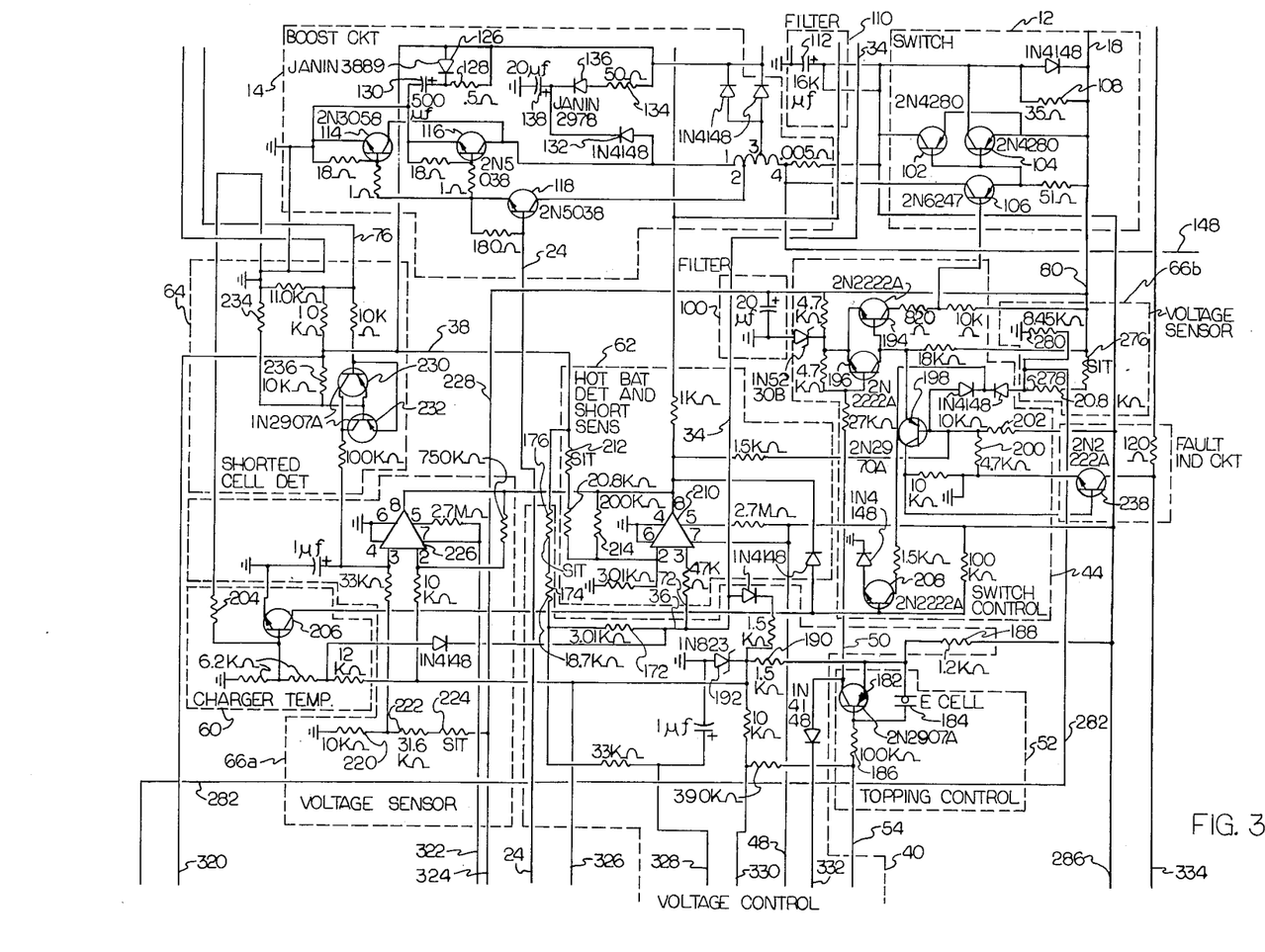
FIGS. 3 and 4 illustrate practical circuitry of a battery charger of the instant invention.
Figure 4:
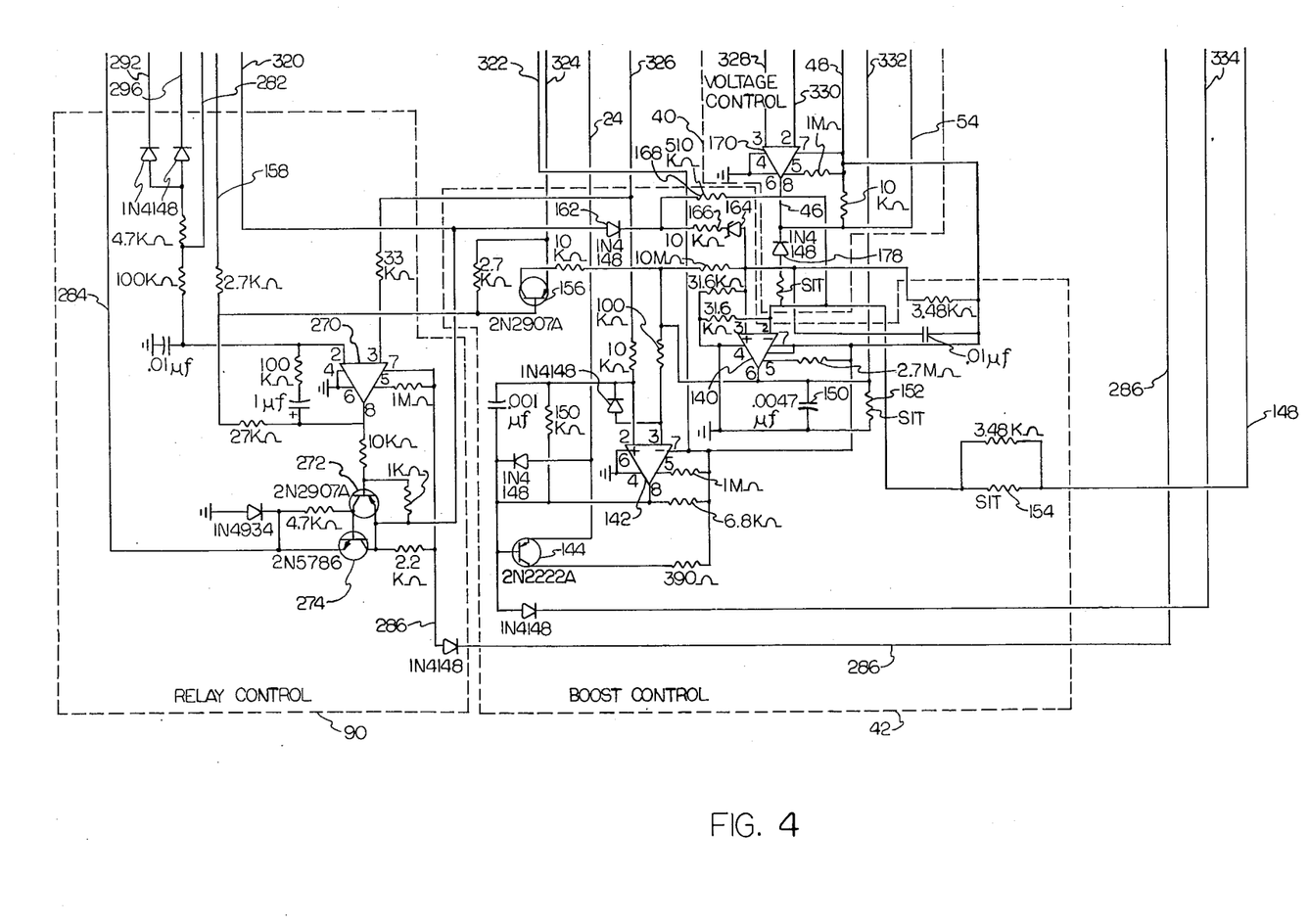

The various modes as above discussed, are graphically illustrated in FIG. 2. Graph I depicts battery terminal voltage as a function of the state of charge of the battery or time during the imposition of a charge with a battery charger of the invention. Graph II of FIG. 2 shows the average charging current as a function of the state of charge or time during the imposition of a charge with a battery charger of the invention. The values set forth or indicated in Graphs I and II and FIG. 2 are for a battery charger of the present invention as illustrated in FIG. 1, FIGS. 3 and 4 having an input voltage of 28 volts d.c. which is charging a 19 cell nickel cadmium battery which is at a temperature of about 25° Centigrade (77° Fahrenheit).

Referring again to FIG. 1, the battery charger of the instant invention preferably includes a Safety Circuit II. The Safety Circuit II has circuits to protect the battery charger and the battery 26 from unsafe conditions. The Safety Circuit II may include a battery charger temperature detector 60, a shorted sensor and hot battery detector circuit 62, a shorted cell detector 64, and an input voltage sensor 66.

The charger temperature detector 60 includes means to detect an unsafe battery charger temperature which is positioned in or about the chassis and components of the charger itself. The detector 60 also includes circuit means to generate a high charger temperature signal and supply it to the switch control 44 via conductors 68 and 70. Upon receipt of a high charger temperature signal, the switch control 44 sends a switching signal to the switch means 12 to cause the switch means 12 to become non-conductive. With the switch means 12 non-conductive, the battery charger ceases to supply charging current and in turn stops generating heat related to the generation and transmission of such current. Upon cooling down, the high charger temperature signal is removed and the charger may automatically return to normal operation. When a charger of the type illustrated in FIGS. 3 and 4 is charging a 19 cell nickel cadmium battery, the hot battery charger signal is preferably generated when the temperature of about 180° Fahrenheit is detected. The signal is removed (reset) when the charger has cooled to about 175° Fahrenheit.

The shorted sensor and hot battery detector 62 is conductively connected by conductors 34 and 72 to receive an input from the temperature sensing means 30. Upon receipt of a signal from the temperature sensing means 30 reflecting an unsafe battery temperature, the detector 62 sends a hot battery signal to the switch control 44 via conductors 74 and 70. The switch control 44 in turn sends a switching signal to the switch means 12 to cause the switch means to become non-conductive. Accordingly, charging is stopped to allow the battery 26 to cool. When the signal from the temperature sensing means 30 reflects a return to safe battery temperature (e.g., 115° Fahrenheit), the hot battery signal is removed (reset). The switch control 44 in turn allows the switch means 12 to return to a conductive state.

The temperature sensing means 30 is preferably selected to be of the type that will indicate a high battery temperature when electrically shorted. For example, a temperature sensitive resistor as hereinbefore discussed would be suitable. Accordingly, the shorted sensor and hot battery detector 62 will detect a shorted sensor 30 because the temperature reflective signal will indicate an unsafe (high) battery temperature. The detector 62 will thus send a hot battery signal as hereinbefore discussed.

The Safety Circuit II may also include a shorted cell detector 64 which is conductively connected to receive a shorted cell signal from the battery 26 via conductor 76. The conductor 76 is connected to the electrical midpoint of the battery 26. For a 19 cell nickel cadmium battery, the conductor 76 would be electrically connected to the positive terminal of the tenth cell (counting cells numerically from negative to positive terminals of the battery). The detector 76 detects the existance of any voltage imbalance between the halves of the battery 26. Thus, if a cell is over-voltage or under-voltage, a voltage imbalance will occur; and the shorted cell detector will detect the imbalance and supply a shorted cell signal to the switch control 44 via conductors 78 and 70. The switch control 44 in turn causes the switch means 12 to become non-conductive.

The voltage sensor 66 is conductively connected by conductor 80 to receive an input power voltage signal. Upon detecting a high input power voltage condition, the voltage sensor 66 sends an over-voltage signal to the switch control via conductors 82 and 70 to cause the switch means 12 to become non-conductive. For example, for the battery charger of FIGS. 3 and 4 charging a 19 cell nickel cadmium battery, input power voltage is preferably between 25 and 28.5 volts d.c. If the power voltage exceeds 29.0 volts d.c. charging terminates until the voltage falls below 28.5 volts.

The Safety Circuit II may also include a fault indicator circuit 84. The fault indicator circuit 84 receives all of the fault signals from the voltage sensor 66, charger temperature detector 60, hot battery detector 62 and shorted cell detector 64 via conductor 86. The fault indicator circuit 84 supplies a signal to an external indicator (e.g., audio or visual alarm) to indicate the existence of a fault condition.

The Control Circuit I may also include a relay control circuit 90 which optionally functions to control various relays pertaining to the battery charger and the direct current system of the battery charger platform as more fully discussed hereinafter.

Referring now to FIGS. 3 and 4, practical circuitry of a battery charger of the instant invention is depicted with component identification and values. Referring in particular to FIG. 3, power is received by the switch 12 from the power connector 10 (FIG. 1) via conductor 18. Input power is filtered by input filter 100 to prevent reflection of circuit noise generated in the charger back through connector 10 (FIG. 1) into the external source 16 (FIG. 1). The input filter 100 also protects the charger from any short duration transient signals which may be present on the input power connector 18 from the external source 16 (FIG. 1).

The switch 12 includes three high current, low saturation voltage transistors 102, 104, 106 whose function is to open the current path from the input power connector 10 to the boost circuit 14 when charging current is not desired. Resistor 108 (35 ohms) is placed across the switch to provide for mode one trickle charging (modified non-conductive state) when the battery 26 is too deeply discharged to permit normal charging as in modes 2, 3 and 4.

In the embodiment illustrated in FIG. 3, an internal filter 110 is provided which has a high capacitance capacitor 112 (16,000 micro-farads). The filter 110 provides line stabilization for the input power line 18 through switch 12. The filter 110 also acts as an internal source of high energy pulses to charge the battery 26 through the boost circuit 14 in mode three. The filter 110 further acts as a major filter for transients and electromagnetic interference.

The boost circuit 14 primarily consists of transistors 114, 116 and 118, diodes 120 and 122, and inductor 124. Transistor 118 drives the switching transistors 114 and 116. When transistors 114 and 116 are turned on, current flows through the inductor 124. When they turn off, the value of the current that had been flowing through the inductor 124, multiplied by the turns ratio of the indicator 124 is transferred through the diodes 120 and 122 into the battery 26. The circuit comprised of diode 126, resistor 128 and capacitor 130 acts as a filter network to filter and smooth the leading edge of a battery charging current pulse (e.g., mode three) and to further reduce electromagnetic interference on the battery charging current pulses. High voltage spikes which may be caused by stray inductances are filtered by diode 132, resistor 134, zener diode 136 and capacitor 138.

The boost control circuit 42 (FIG. 4) is primarily comprised of amplifiers 140 and 142 and transistor 144. Amplifier 140 senses the voltage drop across the current sensing resistor 146 in the boost circuit 14 (FIG. 3) via conductor 148. When the current through the current sensing resistor 146 reaches an appropriate level, the voltage at the output (pin 6) of amplifier 140 causes amplifier 142 and in turn transistor 144 to turn off, removing the drive signal from transistor 118 in the boost circuit 14 via conductor 24. This in turn causes the power transistors 114, 116 of the boost circuit 14 (FIG. 3) to shut-off so that the current through the inductor 124 (FIG. 3) and in turn the current sensing resistor 146 rises to about 2.5 times the shut-off current value and then decreases. When the current through the current sensing resistor 146 (FIG. 3) decreases to a predetermined level, amplifier 40 turns off and the voltage at its output (pin 6) begins to decrease. The rate of decrease is controlled by the capacitor 150 (0.0047 micro-farads) and resistor 152 (value set in testing). When the level of amplifier 140 output voltage (pin 6) drops below its bias voltage, amplifier 142 turns on again and the cycle is repeated to effect pulse charging (mode three). The amplitude of the charging current pulse is controlled by dropping resistor 154 the value of which is selected in testing (SIT). Resistor 152 controls the value of the average charging current in mode three. As the battery voltage increases, the pulse frequency increases to provide a constant current charge.

One optional feature of the illustrated charger not heretofore discussed in the inhibit feature. That is, the charger can be electrically "turned-off" or inhibited from charging. By grounding its base, transistor 156 turns on and holds the output (pin 6) of amplifier 140 high. This in turn prevents amplifier 142 and transistor 144 from turning on. Accordingly, transistor 118 (FIG. 3) does not get a drive signal so that transistors 114 and 116 shut off the current flow through the inductor 124 (FIG. 3). The ground signal may be supplied from an external location via conductor 158 and isolating resistor 160.

Circuitry of the boost control 42 (FIG. 3) comprised of diode 162, zener diode 164 and resistor 166 senses open battery leads and prevents the charger from generating an excessive charger output voltage which could be hazardous to the charger and to a person who might be physically proximate charger output leads. Voltage sensing resistor 168 (510 kilo ohms) senses the differential voltage between the battery 26 and input power (line 18) and adjusts the pulse frequency of the charger in mode three to maintain a constant average charging current signal.

The voltage control circuit 40 (FIGS. 3 and 4) has an operational amplifier 170 which senses the battery voltage via conductor 38 and battery temperature via conductor 36. The temperature sensing means 30 is a resistor having a resistance of 3,000 ohms at 25° Centigrade and having a positive temperature coefficient. It forms a voltage divider network with resistors 172, 174 and 176 to provide a signal proportional to battery voltage corrected for temperature. The amplifier 170 senses the signal to determine the charging mode. In modes one, two and three the output of the amplifier 170 remains high. When the battery voltage reaches 95 percent fully charged voltage (29.5 volts d.c. for the battery described with respect to FIG. 2), the output (pin 8) of amplifier 170 goes low. Upon going low, diode 178 and dropping resistor 180 draw some of the bias current being supplied to amplifier 140 of the boost control circit 42. This in turn lowers the amplitude of the charge current pulses to approximately one-third of their former amplitude.

The topping control 52, consisting essentially of transistor 182 and E-cell 184. E-cell 184 controls the time in which the charger remains in the topping mode (mode four). The E-cell 184 is an electroplating device with a silver case and an internal gold anode. When the output of amplifier 170 is high, the E-cell 184 is biased with its anode negative. Current thus flows through current limiting resistor 186 which causes silver to plate the gold anode of the E-cell. The plating continues until the output (pin 8) of amplifier 170 goes low, the plating process then reverses and the silver migrates from the anode back to the case of the E-cell 184. When all the silver has been removed from the anode of the E-cell 184, the voltage across the E-cell rises until transistor 182 turns on. Upon turning on, transistor 182 holds the output of the boost control amplifier 140 high to terminate charging. Transistor 182 also provides a signal to the switch control 44 via conductor 50 to cause the switch 12 to open (become non-conductive). The divider, comprised of resistors 188 and 190 and zener diode 192, provides a bias for the E-cell 184 such that it will discharge in approximately one-third the time it was being charged. That is, mode four will be in operation for approximately one-third the time of mode three operation.

The switch control circuit of FIG. 3 includes transistors 194, 196 and 198. When the battery voltage is less than about 18 volts (deeply discharged), the voltage divider comprised of resistors 200 and 202 supplies a signal to turn on transistor 198. When transistor 198 is turned on, transistor 194 is prevented from turning on, thereby holding switch 12 in a non-conductive modified state. That is, the switch 12 is held open while trickle charging current passes through resistor 108 of the switch 12 to charge capacitor 112 of the internal filter 110 and to trickle charge (mode one) the battery 26 through inductor 124 and diodes 120 and 122. When the battery voltage reaches about 18 volts, transistor 194 is allowed to turn on driving the switch 12 into conduction. Resistor 108 is thus bypassed and a charging current of up to about 50 to 60 (about 3C) amperes passes to the battery through inductor 124 and diodes 120 and 122 (mode two). As the battery voltage rises, the charging current decreases until at about 20 amperes (about 1C), the boost control 42 starts pulse charging at a low pulse repetition rate. As the battery voltage continues to rise, the pulse repetition rate (frequency) increases to maintain a constant average charging current of about 20 amperes (1C) in mode three. The switch control 44 also senses the operation of the Safety Circuit II and relay control 90 as and causes the switch 12 to become non-conductive as more fully discussed hereinafter.

The charger temperature detector 60 is comprised of a temperature sensing resistor 204 and transistor 206. The sensing resistor 204 is a 50,000 ohm resistor with a negative temperature coefficient. When the battery charger temperature reaches about 180° Fahrenheit, its resistance is reduced to about 2,700 ohms, the increased current drains through the sensing resistor 204 thus causes transistor 206 to turn off. This in turn causes transistor 208 in the switch control 44 to turn on. Transistor 208 causes transistor 198 to turn on to turn transistor 194 off and in turn hold switch 12 in a non-conductive state. Transistor 206 will turn back on and allow the switch 12 to become conductive when the charger temperature has decreased or cooled to about 175° Fahrenheit.

The shorted sensor and hot battery detector 62 includes an operational amplifier 210 which receives a temperature reflective signal from the temperature sensing means 30 via conductors 34 and 72. Biasing resistor 212 is selected to cause the amplifier 210 to turn on when the temperature sensing means 30 indicates a temperature of about 130°-135° Fahrenheit. Holding resistor 214 causes the amplifier 210 to stay on until the temperature indicated has fallen below about 115° ± 5° Fahrenheit.

The voltage sensor 66 of this embodiment is comprised of a high voltage sensor 66a and a low voltage sensor 66b. The high voltage sensor 66a includes a divider comprised of resistors 220, 222 and 224 and an operational amplifier 226. Upon detecting the presence of a high voltage (29.0 volts) on the input bus via conductors 80 and 228, the amplifier 226 output (pin 8) goes to a low state allowing transistor 198 to turn on and switch 12 to become non-conductive.

The shorted cell detector 64 includes transistors 230 and 232. The base of transistor 230 is connected to a tap on the positive terminal of the tenth cell of the 19 cell nickel cadmium battery under charge. A voltage divider comprised of resistors 234 and 236 provides a voltage equal to the tap voltage. IF the tap voltage received via conductor 76 changes by about 1 volt, transistors 230 and 232 will conduct causing the amplifier 226 of the voltage sensor 66b to go low which in turn causes the switch 12 to become non-conductive.

The fault indicator circuit 84 is comprised of transistor 238. Whenever the switch control 44 receives a fault signal, transistor 238 is turned on to provide a 40 milliampere path to ground to turn on a remote d.c. fault indicator (e.g., lamp).

It should be noted that FIGS. 3 and 4 are in effect separate halves of a single circuit diagram which should be read together. Electrical conductors 24, 48, 54, 148, 158, 282, 286, 320, 324, 326, 328, 330, 332 and 334 are the interconnecting conductors between FIGS. 3 and 4.

As herein indicated, the battery charger of the invention is particularly suitable for use on board aircraft. The need to have a battery charger which automatically, reliably and safely charges the aircraft's battery and maintains it fully charged is well known. The charger illustrated and described in FIGS. 3 and 4 is such a charger. That is, it is particularly adapted for use on board aircraft having a 19 cell nickel cadmium battery. Recognizing that the platform (aircraft) of the battery charger has certain operational requirements and features which should be taken into account, it is highly preferred to include interfacing components and circuitry in the battery charger to accommodate those requirements and features. The need for separate components to interface the charger with the aircraft electrical system is thereby eliminated. Further, there may arise savings in maintenance costs in addition to savings in space and weight which are often frequently critical factors in relation to aircraft.

Figure 5:
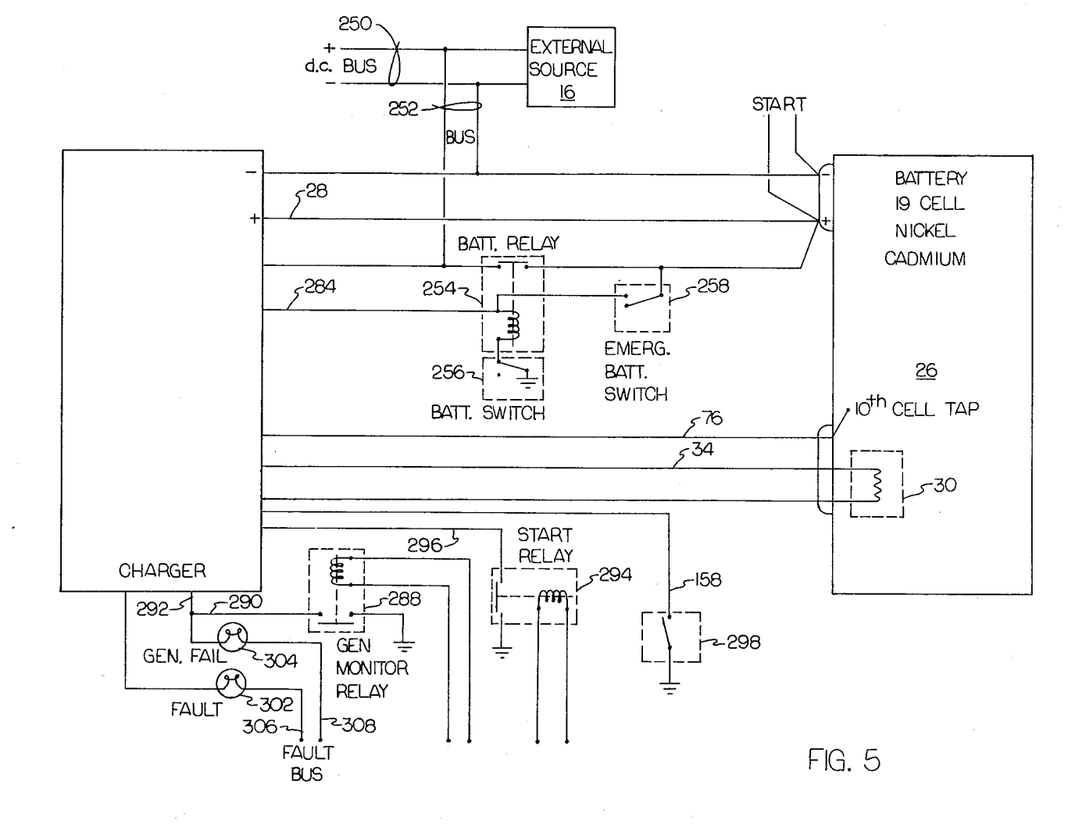
FIG. 5 is a simplified diagram reflecting interface components between a battery charger of the invention, a battery and the related electrical system of an aircraft.

FIG. 5 illustrates in a simplified manner the interface requirements and features provided in the battery charger of the instant invention as set forth in more detail in FIGS. 3 and 4. Referring in particular to FIG. 5, the external source 16 depicted is a generator typically associated with an engine on board the aircraft. The source 16 includes means to rectify and regulate as necessary to supply a direct current (d.c.) output to the aircraft's d.c. bus 250. The bus 250 typically supplies power to various aircraft loads many of which may be regarded as safety loads or emergency circuits. Power from the bus 250 is also supplied to the battery charger by conductors 252. If the external source 16 is not avialable (e.g., generator failure), power from the battery 26 is required to supply the d.c. bus 250. Although it is possible to electrically float the battery 26 on the d.c. bus in electrical parallel with the source 16, in many applications it is not desirable to do so for a variety of reasons including the fact that the battery 26 would not necessarily be optimally charged nor capable of being optimally charged. Accordingly, a battery relay 254 is provided to automatically connect and disconnect the battery 26 to the d.c. bus 250. A manual battery switch 256 is also provided which can be used to remove the ground path for the relay 252 to defeat relay 254 operation and isolate the battery 26 from the bus 250. The relay 254 is controlled by the charger as more fully discussed herein. However, in the event of charger failure, a manually operated emergency battery switch 258 is connected to the battery 26 to provide an alternate and emergency current source to operate the battery relay 254.

Referring now to FIG. 4, the relay control circuit 90 is comprised of an operational amplifier 270 and two transistors 272, 274. The low voltage sensor 66b is a divider network comprised of resistors 276, 278 and 280. When the voltage on the input bus 18 drops below about 24 volts d.c., the low voltage sensor 66b generates a ground signal which is supplied to the relay control circuit 90 via conductor 282. Upon sensing the ground signal, amplifier 270 goes low causing transistors 272 and 274 to turn on and supply a current to operate the battery relay 254 via conductor 284 when the battery switch 256 is closed as shown in FIG. 5. At the same time a signal is sent via conductor 286 (FIGS. 3 and 4) to the switch control 44 to cause the switch 12 to become non-conductive.

Referring again to FIG. 5, a relay (normally energized and open) 288 is provided which monitors operation of the generator of source 16. The monitor itself may be any means (e.g., a current transformer on the generator output) which sends a current signal to the relay 288 as long as the generator operates. Upon failure, the current signal is no longer present and the relay closes sending a ground signal to the relay control circuit 90 in the charger via conductors 290 and 292 to the same effect and result as the ground signal from the low voltage sensor 66b.

In starting an aircraft engine, power may be provided from a source external to the aircraft, from separate starting batteries, or from the battery 26. When the start power is applied, it may be desirable or necessary to energize the d.c. bus 250 and maintain it energized with a constant reliable source of power. Accordingly, a start relay 294 is provided which receives a current signal when starting circuits are energized. The current signal causes the relay 294 to close and send a ground signal to the relay control 90 of the charger via conductor 296 to the same effect as the ground signal from the low voltage sensor 66b.

FIG. 5 also depicts a charger override switch 298 which sends an inhibit (ground) signal to the charger via conductor 158. FIG. 5 further illustrates a fault light 302 and a generator fail light 304. The fault and generator fail lights 302, 304 are connected by conductors 306 and 308, respectively, to a positive fault bus. When transistor 238 (FIG. 3) of the fault indicator turns on and provides a ground, the fault light is illuminated. When the generator monitor relay 288 operates, the ground provided by it completes a circuit to cause the generator fail light to illuminate. Both the fault and generator fail lights are located preferably in the cockpit area of the aircraft.

It should be noted that the illustrated embodiment has been described largely with respect to a 19 cell nickel cadmium battery in an airborne application. However, those skilled in the art will recognize that the principles of the invention herein described and illustrated are applicable for a wide variety of batteries in various applications. In particular, the automatic multiple mode features make the charger of this invention suitable for use with military tanks, surface effect watercraft, hovercraft, power boats, heavy equipment (e.g., bulldozers) and the like. The charger of the instant invention may also be used with emergency, safety or security systems to maintain associated batteries in an optimum state of charge. Accordingly, it is to be understood that the embodiments of the invention herein described are merely illustrative of the application of the principles of the invention. Reference herein to details of the illustrated embodiment is not intended to limit the scope of the claims which themselves recite those features regarded as essential to the invention.

We claim:

1. A battery charger comprising:

power connector means for removable conductive connection to an external source of direct current power;

switch means conductively connected to said power connector means to receive power therefrom;

a boost circuit conductively connected to said switch means to receive power therefrom and removably conductively connected to a battery to be charged to supply power thereto;

temperature sensing means positioned to sense the temperature of said battery and generate a temperature reflective signal;

a control circuit (1) conductively connected to said battery to receive a battery voltage signal therefrom, (2) conductively connected to said switch means to supply a switching signal thereto, (3) conductively connected to said boost circuit to supply a boosting signal thereto, and (4) conductively connected to said temperature sensing means to receive said temperature reflective signal, said control circuit (1) receiving said battery voltage signal and said temperature reflective signal to determine the temperature adjusted stage of charge of said battery, (2) supplying said switching signal to cause said switch means to supply power to said boost circuit in accordance with a preselected charging program related to said battery's state of charge, and (3) supplying said boosting signal to said boost circuit to cause said boost circuit to supply charging current signals to said battery which vary in magnitude and form in accordance with said preselected charging program related to said state of charge of said battery.

2. The battery charger of claim 1 wherein said control circuit includes:

voltage control means which receives said battery voltage signal and said temperature reflective signal and generates an output signal reflecting the temperature adjusted state of charge of said battery;

a boost control circuit conductively connected (1) to receive the output of said voltage control means, (2) to supply said boosting signal, and (3) to receive a topping signal;

a topping control circuit conductively connected (1) to receive the output of said voltage control means and (2) to supply a topping signal to said boost control circuit;

a switch control circuit conductively connected (1) to receive a topping signal from said topping control circuit, (2) to receive the output signal of said voltage control means, and (3) to supply said switching signal; and wherein
said preselected charging program is comprised of a plurality of charging modes automatically selected by said control circuit which are related to the state of charge of said battery.

3. The battery charger of claim 2 wherein said preselected charging program is comprised of:
a first mode in which said temperature adjusted state of charge of said battery reflects a battery state of charge of effective total discharge wherein said switch control and said boost control generate boosting signal and switching signals respectively which cause said switch means and boost circuits to pass a trickle charge current to said battery;
a second mode in which said temperature adjusted state of charge of said battery reflects a battery state of charge of substantial discharge wherein said switch control generates a switching signal to cause said switch to be conductive and pass full main power to said boost circuit and said boost control generates a boosting signal to cause said boost circuit to supply a large charging current to said battery which diminishes at a preselected rate until said temperature adjusted state of charge of said battery reflects a low stage of charge of said battery;
a third mode in which said temperature adjusted state of charge of said battery reflects a low state of charge of said battery, said switch control generates a switching signal which causes said switch to be conductive and pass main power to said boost circuit and said boost control generates a boosting signal to cause said boost circuit to supply a charging signal to said battery comprised of intervaled pulses of direct current until said temperature adjusted state of charge of said battery reflects a nearly fully charged state of charge of said battery;
a fourth mode in which said temperature adjusted state of charge of said battery reflects a nearly fully charged state of charge said switch control generates a switching signal to cause said switch to be conductive and pass main power to said boost circuit and said topping control generates a topping signal to cause said boost control to generate a boosting signal which in turn causes said boost circuit to supply a charging signal comprised of intervaled pulses of direct current having an average trickle charge value for a preselected period of time.

4. The battery charger of claim 3 wherein said charging program includes a fifth mode in which said temperature adjusted state of charge of said battery reflects a preselected state of charge less than nearly fully charged and more than a low state of charge wherein said control circuit operates to repetitively charge in said third mode and then in said fourth mode for a preselected period of time.

5. The battery charger of claim 4 wherein said boost control generates a boosting signal to cause said boost circuit to supply a charging signal to said battery in said third mode which is comprised of intervaled pulses of direct current which increase in frequency to maintain a constant average charging current as the battery state of charge increases.

6. The battery charger of claim 1 further comprising a safety circuit conductively connected to receive signals reflecting charger and battery parameters and to said control circuit to supply a safety signal wherein said safety circuit includes means to receive said signal reflecting charger and battery parameters and generate safety signals reflective of preselected unsafe parameters to cause said control circuit to send a switching signal to in turn cause the switch means to become nonconductive.

7. The battery charger of claim 6 wherein said safety circuit includes voltage sensor means conductively connected to said main power connector to sense input power voltage and to said switch control to cause said switch control to generate a switching signal which in turn causes said switch means to become nonconductive when said input power voltage is outside of a preselected range.

8. The charger of claim 7 wherein said safety circuit includes charger temperature detector means conductively connected to said switch control, said charger temperature detector means generating a high charger temperature signal when the temperature of the battery charger reaches a first preselected temperature and remains above a second preselected temperature which is below said first preselected temperature and supplying said signal to said switch control to cause said switch control to send a switching signal to said switch means to cause said switch means to become nonconductive.

9. The charger of claim 8 wherein said safety circuit includes a shorted sensor and hot battery detector circuit conductively connected to said temperature sensing means to receive signals therefrom and conductively connected to said switch control, said shorted sensor and hot battery detector circuit generating a safety signal when said temperature sensing means supplies a temperature reflective signal indicating that said battery has reached a preselected temperature and when said temperature sensing means supplies a signal reflecting that said temperature sensing means has become electrically shorted and supplying a safety signal to said switch control to cause said switch control to generate a switching signal to cause said switch means to become nonconductive.

10. The charger of claim 9 wherein said safety circuit includes a shorted cell detector conductively connected to said battery to receive a signal reflecting a shorted battery cell condition and conductively connected to said switch control, said shorted cell detector generating a safety signal when a signal reflecting a shorted battery cell condition is received and supplying said safety signal to said switch control to cause said switch control to send a switching signal to said switch means to cause said switch means to become nonconductive.

11. The charger of claim 10 wherein said safety circuit includes a fault indicator circuit conductively connected (1) to said voltage sensor to receive an over voltage signal reflecting input power over voltage, (2) to said charger temperature detector to receive said high charger temperature signal, (3) to said shorted sensor and hot battery detector to receive its output safety signal and (4) to said shorted cell detector to receive its output safety signal, said fault indicator circuit generating a fault signal, said fault indicator circuit generating a fault signal and supplying it to an external indicator to cause external indication thereof upon receipt of an input signal.

12. The battery charger of claim 11 wherein said control circuit includes:

voltage control means which receives said battery voltage signal and said temperature reflective signal and generates an output signal reflecting the temperature adjusted state of charge of said battery;

a boost control circuit conductively connected (1) to receive the output of said voltage control means, (2) to supply said boosting signal, and (3) to receive a topping signal;

a topping control circuit conductively connected (1) to receive the output of said voltage control means and (2) to supply a topping signal to said boost control circuit;

a switch control circuit conductively connected (1) to receive a topping signal from said topping control circuit, (2) to receive the output signal of said voltage control means, and (3) to supply said switching signal; and wherein said preselected charging program is comprised of a plurality of charging modes automatically selected by said control circuit which are related to the state of charge of said battery.

13. The battery charger of claim 12 wherein said preselected charging program includes:

a first mode in which said temperature adjusted state of charge of said battery reflects a battery state of charge of effective total discharge, said switch control and said boost control generate boosting signal and switching signals respectively which cause said switch means and boost circuits to pass a trickle charge current to said battery;

a second mode in which said temperature adjusted state of charge of said battery reflects a battery state of charge of substantial discharge, said switch control generates a switching signal to cause said switch to be conductive and pass full main power to said boost circuit and said boost control generates a boosting signal to cause said boost circuit to supply a large charging current to said battery which diminishes at a preselected rate until said temperature adjusted state of charge of said battery reflects a low state of charge of said battery;

a third mode in which said temperature adjusted state of charge of said battery reflects a low state of charge of said battery, said switch control generates a switching signal which causes said switch to be conductive and pass main power to said boost circuit and said boost control generates a boosting signal to cause said boost circuit to supply a charging signal to said battery comprised of intervaled pulses of direct current until said temperature adjusted state of charge of said battery reflects a nearly fully charged state of charge of said battery;

a fourth mode in which said temperature adjusted state of charge of said battery reflects a nearly fully charged state of charge said switch control generates a switching signal to cause said switch to be conductive and pass main power to said boost circuit and said topping control generates a topping signal to cause said boost control to generate a boosting signal which in turn causes said boost circuit to supply a charging signal comprised of intervaled pulses of direct current having an average trickle charge value for a preselected period of time.

14. The battery charger of claim 13 wherein said charging program includes a fifth mode in which said temperature adjusted state of charge of said battery reflects a preselected state of charge less than nearly fully charged and more than a low state of charge, said control circuit operates to charge in said third mode and then in said fourth mode for a preselected period of time.

15. The battery charger of claim 14 wherein said boost control generates a boosting signal to cause said boost circuit to supply a charging signal to said battery in said third mode which is comprised of intervaled pulses of direct current which increase in frequency to maintain a constant average charging current as the battery state of charge increases.

16. The battery charger of claim 15 wherein said control circuit includes a relay control circuit conductively connected (1) to said safety circuit to receive an input power low voltage signal therefrom, (2) to said switch control to supply a relay signal thereto, (3) to external inputs to receive relay operate signals therefrom and (4) to external relays to supply operation signals thereto, said relay control generating and supplying signals to operate relays external to said battery charger and relay signals to cause said switch means to become nonconductive in accordance with preselected relay operating conditions.

17. The battery charger of claim 16 wherein said boost control circuit is conductively connected to an external signal generator to receive a manually initiated inhibit signal which terminates boost control circuit operation.

18. In combination with a vehicle of the type having a high energy battery associated therewith, a battery charger comprising:

power connector means for removable conductive connection to an external source of direct current power;

switch means conductively connected to said power connector means to receive power therefrom;

a boost circuit conductively connected to said switch means to receive power therefrom and removably conductively connected to a battery to be charged to supply power thereto;

temperature sensing means positioned to sense the temperature of said battery and generate a temperature reflective signal;

a control circuit (1) conductively connected to said battery to receive a battery voltage signal therefrom, (2) conductively connected to said switch means to supply a switching signal thereto, (3) conductively connected to said boost circuit to supply a boosting signal thereto, and (4) conductively connected to said temperature sensing means to receive said temperature reflective signal, said control circuit (1) receiving said battery voltage signal and said temperature reflective signal to determine the temperature adjusted state of charge of said battery, (2) supplying said switching signal to cause said switch means to supply power to said boost circuit in accordance with a preselected charging program related to said boosting signal to said boost circuit to cause said boost circuit to supply charging current signals to said battery which vary in magnitude and form in accordance with said preselected charging program related to said state of charge of said battery.

19. The combination of claim 18 further comprising a safety circuit conductively connected to receive signals reflecting charger and battery parameters and to said control circuit to supply a safety signal wherein said safety circuit includes means to receive said signal reflecting charger and battery parameters and generate safety signals reflective of preselected unsafe parameters to cause said control circuit to send a switching signal to in turn cause the switch means to become nonconductive.

20. The combination of claim 19 wherein said safety circuit includes voltage sensor means conductively connected to said main power connector to sense input power voltage and to said switch control to cause said switch control to generate a switching signal which in turn causes said switch means to become nonconductive when said input power voltage is outside of a preselected range.

21. The combination of claim 20 wherein said safety circuit includes charger temperature detector means conductively connected to said switch control, said charger temperature detector means generating a high charger temperature signal when the temperature of the battery charger reaches a first preselected temperature and remains above a second preselected temperature which is below said first preselected temperature and supplying said signal to said switch control to cause said switch control to send a switching signal to said switch means to cause said switch means to become nonconductive.

22. The combination of claim 21 wherein said safety circuit includes a shorted sensor and hot battery detector circuit conductively connected to said temperature sensing means to receive signals therefrom and conductively connected to said switch control, said shorted sensor and hot battery detector circuit generating a safety signal when said temperature sensing means supplies a temperature reflective signal indicating that said battery has reached a preselected temperature and when said temperature sensing means supplies a signal reflecting that said temperature sensing means has become electrically shorted and supplying a safety signal to said switch control to cause said switch control to generate a switching signal to cause said switch means to become nonconductive.

23. The combination of claim 22 wherein said safety circuit includes a shorted cell detector conductively connected to said battery to receive a signal reflecting a shorted battery cell condition and conductively connected to said switch control, said shorted cell detector generating a safety signal when a signal reflecting a shorted battery cell condition is received and supplying said safety signal to said switch control to cause said switch control to send a switching signal to said switch means to cause said switch means to become nonconductive.

24. The combination of claim 23 wherein said safety circuit includes a fault indicator circuit conductively connected (1) to said voltage sensor to receive an over voltage signal reflecting input power over voltage, (2) to said charger temperature detector to receive said high charger temperature signal, (3) to said shorted sensor and hot battery detector to receive its output safety signal and (4) to said shorted cell detector to receive its output safety signal, said fault indicator circuit generating a fault signal, said fault indicator circuit generating a fault signal and supplying it to an external indicator to cause external indication thereof upon receipt of an input signal.

25. The combination of claim 24 wherein said control circuit includes:
    voltage control means which receives said battery voltage signal and said temperature reflective signal and generates an output signal reflecting the temperature adjusted state of charge of said battery;
    a boost control circuit conductively connected (1) to receive the output of said voltage control means, (2) to supply said boosting signal, and (3) to receive a topping signal;
    a topping control circuit conductively connected (1) to receive the output of said voltage control means and (2) to supply a topping signal to said boost control circuit;
    a switch control circuit conductively connected (1) to receive a topping signal from said topping control circuit, (2) to receive the output signal of said voltage control means, and (3) to supply said switching signal; and wherein
    said preselected charging program is comprised of a plurality of charging modes automatically selected by said control circuit which are related to the state of charge of said battery.

26. The combination of claim 8 wherein said preselected charging program includes:
    a first mode in which said switch means and said boost circuit pass a constant trickle charge current to said battery when said battery is at and below a state of substantially total discharge;
    a first mode in which said temperature adjusted state of charge of said battery reflects a battery state of charge of effective total discharge, said switch control and said boost control generate boosting signal and switching signals respectively which cause said switch means and boost circuits to pass a trickle charge current to said battery;
    a second mode in which said temperature adjusted state of charge of said battery reflects a battery state of charge of substantial discharge, said switch control generates a switching signal to cause said switch to be conductive and pass tull main power to said boost circuit and said boost control generates a boosting signal to cause said boost circuit to supply a large charging current to said battery which diminishes at a preselected rate until said temperature adjusted state of charge of said battery reflects a low state of charge of said battery;
    a third mode in which said temperature adjusted state of charge of said battery reflects a low state of charge of said battery, said switch control generates a switching signal which causes said switch to be conductive and pass main power to said boost circuit and said boost control generates a boosting signal to cause said boost circuit to supply a charging signal to said battery comprised of intervaled pulses of direct current until said temperature adjusted state of charge of said battery reflects a nearly fully charged state of charge of said battery;
    a fourth mode in which said temperature adjusted state of charge of said battery reflects a nearly fully charged state of charge said switch control generates a switching signal to cause said switch to be conductive and pass main power to said boost circuit and said topping control generates a topping signal to cause said boost control to generate a boosting signal which in turn causes said boost circuit to supply a charging signal comprised of intervaled pulses of direct current having an average trickle charge value for a preselected period of time.

27. The combination of claim 26 wherein said charging program includes a fifth mode in which said temperature adjusted state of charge of said battery reflects a preselected state of charge less than nearly fully charged and more than a low state of charge, said control circuit operates to charge in said third mode and then in said fourth mode for a preselected period of time.

28. The combination of claim 27 wherein said boost control generates a boosting signal to cause said boost circuit to supply a charging signal to said battery in said third mode which is comprised of intervaled pulses of direct current which increase in frequency to maintain a constant average charging current as the battery state of charge increases.

29. The combination of claim 28 wherein said control circuit includes a relay control circuit conductively connected (1) to said safety circuit to receive an input power low voltage signal therefrom, (2) to said switch control to supply a relay signal thereto, (3) to external inputs to receive relay operate signals therefrom and (4) to external relays to supply operation signals thereto, said relay control generating and supplying signals to operate relays external to said battery charger and relay signals to cause said switch means to become nonconductive in accordance with preselected relay operating conditions.

30. The combination of claim 29 wherein said boost control circuit is conductively connected to an external signal generator to receive a manually initiated inhibit signal which terminates boost control circuit operation.

31. The combination of claim 30 wherein said external inputs of said relay control include a signal indicating failure of said external source and a signal indicating engine start, and wherein said fault circuit is comprised of means to illuminate an external lamp indicator visually observable by personnel operating said vehicle.

* * * * *